(12) United States Patent
Jang

(10) Patent No.: US 9,473,923 B2
(45) Date of Patent: Oct. 18, 2016

(54) APPARATUS AND METHOD FOR SEARCHING ACCESS POINTS IN PORTABLE TERMINAL

(75) Inventor: Seok-Min Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 770 days.

(21) Appl. No.: 13/299,302

(22) Filed: Nov. 17, 2011

(65) Prior Publication Data

US 2012/0147041 A1 Jun. 14, 2012

(30) Foreign Application Priority Data

Dec. 14, 2010 (KR) ........................ 10-2010-0127515

(51) Int. Cl.

| | |
|---|---|
| *H04W 8/00* | (2009.01) |
| *H04N 1/00* | (2006.01) |
| *H04W 4/04* | (2009.01) |
| *G01S 5/02* | (2010.01) |
| *H04W 48/16* | (2009.01) |
| *H04W 88/08* | (2009.01) |
| *H04L 29/08* | (2006.01) |

(52) U.S. Cl.
CPC ......... *H04W 8/005* (2013.01); *H04N 1/00315* (2013.01); *H04W 4/043* (2013.01); *G01S 5/0236* (2013.01); *G01S 5/0242* (2013.01); *H04L 67/18* (2013.01); *H04N 1/0044* (2013.01); *H04W 48/16* (2013.01); *H04W 88/08* (2013.01)

(58) Field of Classification Search
None
See application file for complete search history.

(56) References Cited

U.S. PATENT DOCUMENTS

| | | | |
|---|---|---|---|
| 2003/0013461 A1* | 1/2003 | Mizune et al. ............... | 455/456 |
| 2007/0081474 A1 | 4/2007 | Sasaki | |
| 2008/0151842 A1* | 6/2008 | Tysowski et al. ............ | 370/338 |
| 2011/0018732 A1* | 1/2011 | Cho et al. ................ | 340/825.49 |
| 2011/0182250 A1* | 7/2011 | Shin et al. .................... | 370/329 |
| 2011/0244892 A1* | 10/2011 | Macmanus et al. .......... | 455/457 |

FOREIGN PATENT DOCUMENTS

| | | |
|---|---|---|
| CN | 1964298 A | 5/2007 |
| EP | 2184927 A1 | 5/2010 |
| JP | 2004 187106 | 7/2004 |
| JP | 2006-262175 A | 9/2006 |

(Continued)

OTHER PUBLICATIONS

European Search Report dated Feb. 2, 2012 in connection with European Patent Application No. 11192956.8.
Notice of Preliminary Rejection dated Jul. 21, 2015 in connection with Japanese Patent Application No. 2011-264274; 9 pages.
The First Office Action dated Sep. 18, 2015 in connection with Chinese Patent Application No. 201110421209.1; 17 pages.
Office Action and English translation issued for JP 2011-264274 dated Dec. 11, 2015, 5 pgs.
Second Office Action dated May 25, 2016 in connection with Chinese Application No. 201110421209.9, 13 pages.
Notice of Patent Grant dated Aug. 31, 2016 in connection with Korean Application No. 10-2010-0127515, 6 pages.

*Primary Examiner* — Jwalant Amin

(57) ABSTRACT

An apparatus and method combine an augmented reality scheme with an AP search function and visually provide positions of searched APs as well as names of the searched APs and strength of signals received from the searched APs. The apparatus includes a communication unit for receiving signals of APs around the portable terminal, an input unit for receiving input for searching the APs, a camera unit for photographing environments around the portable terminal when searching the APs, a display unit for outputting an image photographed by the camera unit on a preview picture, an AP attribute ascertaining unit for ascertaining attributes of the APs which exist around the portable terminal and ascertaining positions of the APs, and a controller for outputting the APs on the preview picture to correspond to the positions of the ascertained APs.

19 Claims, 4 Drawing Sheets

(56) References Cited

FOREIGN PATENT DOCUMENTS

| JP | 2007-104536 | 4/2007 |
|---|---|---|
| JP | 2007-104536 A | 4/2007 |
| JP | 2007-110543 | 4/2007 |
| JP | 2007-110543 A | 4/2007 |
| JP | 2007-150681 | 6/2007 |
| JP | 2010-087829 | 4/2010 |
| WO | WO 2011/126945 A1 | 10/2011 |

* cited by examiner

APPARATUS AND METHOD FOR SEARCHING ACCESS POINTS IN PORTABLE TERMINAL

CROSS-REFERENCE TO RELATED APPLICATION(S) AND CLAIM OF PRIORITY

The present application is related to and claims the benefit under 35 U.S.C. §119(a) of a Korean patent application filed in the Korean Intellectual Property Office on Dec. 14, 2010 and assigned Ser. No. 10-2010-0127515, the entire disclosure of which is hereby incorporated by reference.

TECHNICAL FIELD OF THE INVENTION

The present invention relates to a portable terminal for providing a wireless Local Area Network (LAN) function. More particularly, the present invention relates to an apparatus and method for combining an augmented reality scheme with an Access Point (AP) search function and visually providing positions of searched APs as well as names of the searched APs and strength of signals received from the searched APs.

BACKGROUND OF THE INVENTION

Portable terminals have become necessities of modern life for people of all ages. Thus, service providers and terminal manufacturers are competitively developing differentiated products (or services).

For example, the portable terminal has developed into a multimedia device capable of providing various services such as a phonebook service, a game service, a short message service, an e-mail service, a wake-up call service, an MPEG-1 Audio Layer 3 (MP3) service, a scheduling service, a digital camera service, a multimedia message service, and a wireless Internet service.

In order to use a packet data service including the multimedia message service and the wireless Internet service, the aforementioned portable terminal must perform connection with an AP of the corresponding service.

That is, the portable terminal uses the packet data service by transmitting data to the AP. The portable terminal cannot use the packet data service in environments where the AP does not exist.

In order to use the packet data service, in general, the portable terminal searches APs which exist around it, prioritizes the APs with good signal strength, and wants to connect to the prioritized APs. That is, the portable terminal uses a Wi-Fi profile for storing a list of APs which were connected to the portable terminal and automatically connecting the portable terminal to the APs when the portable terminal enters an area where the APs are positioned.

The aforementioned portable terminal searches the APs which exist around it and provides the searched result to a user. However, the portable terminal does not provide information about positions of the searched APs (existence directions of the APs).

Therefore, when the portable terminal is moved to a position of an AP in a state where it searches only the AP which provides a weak signal by which an Internet service is not used actually, because it may use the Internet service and does not know the position of the AP, there is a problem in that it is impossible to use the Internet service through connection of the AP.

Of course, the above-described problem may be solved by an application for searching a Wi-Fi area. However, there is a problem in that the application may search only free Wi-Fi areas which are provided in advance by a service provider.

Therefore, in order to solve the above-described problems, an apparatus and method for providing position information of searched APs in a portable terminal is needed.

SUMMARY OF THE INVENTION

An aspect of the present disclosure is to solve at least the above-mentioned problems and/or disadvantages and to provide at least the advantages described below. Accordingly, an aspect of the present disclosure is to provide an apparatus and method for improving an AP search function in a portable terminal.

Another aspect of the present disclosure is to provide an apparatus and method for combining an AP search function with an augmented reality scheme in a portable terminal.

Another aspect of the present disclosure is to provide an apparatus and method for providing positions of APs using an augmented reality scheme in a portable terminal.

Another aspect of the present disclosure is to provide an apparatus and method for selecting an AP output on a preview picture and performing connection with the selected AP in a portable terminal.

In accordance with an aspect of the present disclosure, an apparatus for searching an AP in a portable terminal is provided. The apparatus includes a communication unit for receiving signals of APs around the portable terminal, an input unit for receiving input for searching the APs, a camera unit for photographing environments around the portable terminal when searching the APs, a display unit for outputting an image photographed by the camera unit on a preview picture, an AP attribute ascertaining unit for ascertaining attributes of the APs which exist around the portable terminal and ascertaining positions of the APs, and a controller for outputting the APs on the preview picture to correspond to the positions of the ascertained APs.

In accordance with another aspect of the present disclosure, a method of searching an AP in a portable terminal is provided. The method includes photographing environments around the portable terminal and receiving signals of the APs around the portable terminal when searching the APs, outputting the photographed image on a preview picture, ascertaining attributes of the APs which exist around the portable terminal and ascertaining positions of the APs, and outputting the APs on the preview picture to correspond to the positions of the ascertained APs.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

Throughout the drawings, like reference numerals will be understood to refer to like parts, components and structures.

DETAILED DESCRIPTION OF EXEMPLARY EMBODIMENTS

FIGS. 1 through 4B, discussed below, and the various embodiments used to describe the principles of the present disclosure in this patent document are by way of illustration only and should not be construed in any way to limit the scope of the disclosure.

Exemplary embodiments of the present invention will be described herein below with reference to the accompanying drawings. In the following description, well-known functions or constructions are not described in detail since they would obscure the invention in unnecessary detail.

Hereinafter, a description will be given with respect to an apparatus and method for improving an AP search function by providing positions of APs using an augmented reality scheme in a portable terminal according to the present disclosure.

Figure 1:
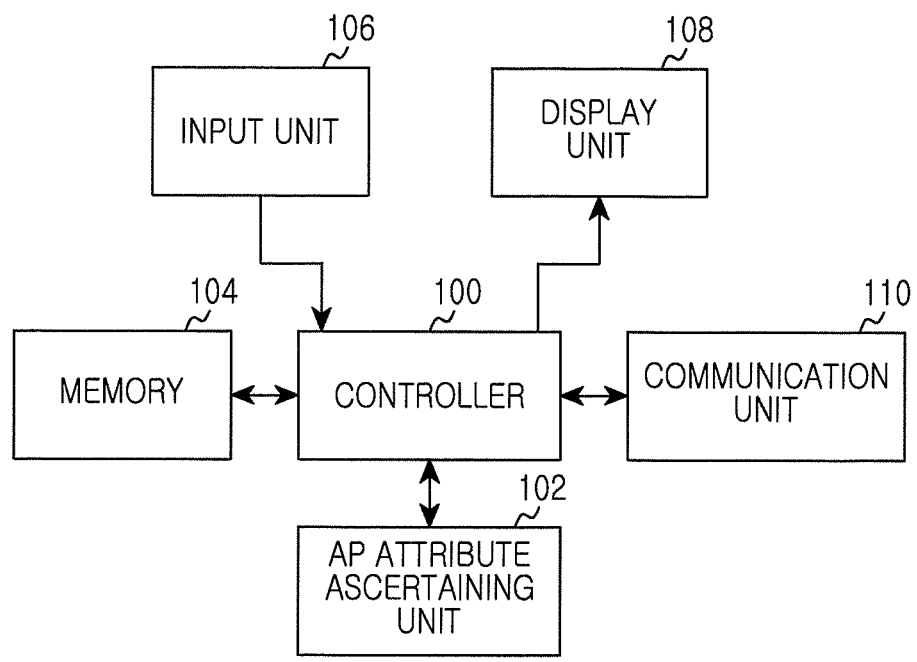
FIG. 1 illustrates a structure of a portable terminal for providing an AP search function using an augmented reality scheme according to the present disclosure.

FIG. 1 illustrates a structure of a portable terminal for providing an AP search function using an augmented reality scheme according to the present disclosure.

Referring to FIG. 1, the portable terminal may includes a controller 100, an AP attribute ascertaining unit 102, a memory 104, an input unit 106, a display unit 108, and a communication unit 110.

First of all, the controller 100 of the portable terminal controls an overall operation of the portable terminal. For example, the controller 100 processes and controls voice telephone call and data communication. In addition, the controller 100 provides position information of APs when searching the APs using an augmented reality scheme according to the present disclosure. In accordance with one embodiment of the present disclosure, the controller 100 may output icons symbolizing APs on real positions of the APs based on a preview picture. Also, the controller 100 performs connection with an AP selected on the preview picture.

The AP attribute ascertaining unit 102 ascertains attribute information including position information of APs which exist around the portable terminal under control of the controller 100 and provides the ascertained attribute information to the controller 100.

At this time, the AP attribute ascertaining unit 102 may ascertain strength of signals received from the APs and directions in which the signals are sensed and may ascertain positions of the APs output on the preview picture.

The memory 104 includes a Read Only Memory (ROM), a Random Access Memory (RAM), and a flash ROM. The ROM stores a microcode of a program, by which the controller 100 and the AP attribute ascertaining unit 102 are processed and controlled, and a variety of reference data.

The RAM is a working memory of the controller 100 and stores temporary data that is generated while a variety of programs are performed. Also, the flash ROM stores a variety of rewritable data, such as phonebooks, incoming messages, outgoing messages, and metadata, and a data storage database. The memory 104 stores information of APs, which is received from the APs around the portable terminal, according to the present disclosure.

The input unit 106 includes numeral key buttons of '0' to '9' and a plurality of function keys such as a menu button, a cancel button, an OK button, a talk button, an end button, an Internet access button, a navigation key (or directional key) button, and a character input key. The input unit 106 provides key input data corresponding to a key pushed by a user to the controller 100.

The display unit 108 displays state information which is generated while the portable terminal is operated, characters, large volumes of moving and still pictures, etc. The display unit 108 reproduces data synchronized between tracks according to the prevent disclosure. The display unit 108 may be a color Liquid Crystal Display (LCD), an Active Matrix Organic Light Emitting Diode (AMOLED), etc. The display unit 108 includes a touch input device. When the display unit 108 is applied to a touch input type portable terminal, it may be used as an input device.

The communication unit 110 transmits and receives a Radio Frequency (RF) signal of data which is input and output through an antenna (not illustrated). For example, in a transmitting process, data to be transmitted is subject to a channel-coding process and a spreading process, and then the data is transformed to an RF signal. In a receiving process, the RF signal is received and transformed to a baseband signal, and the base-band signal is subject to a de-spreading process and a channel-decoding process, thereby restoring the data. The communication unit 110 receives signals received from the APs according to the present disclosure.

The function of the AP attribute ascertaining unit 102 may be performed by the controller 100 of the portable terminal. However, the present disclosure includes the controller 100 and the AP attribute ascertaining unit 102 which are exemplary configurations for the convenience of explanation and are not limited to a scope of the prevent disclosure. It will be understood by those skilled in the art that various changes in form and details may be made therein without departing from the spirit and scope of the present disclosure. For example, all of them may be composed to be processed in the controller 100.

Figure 2:
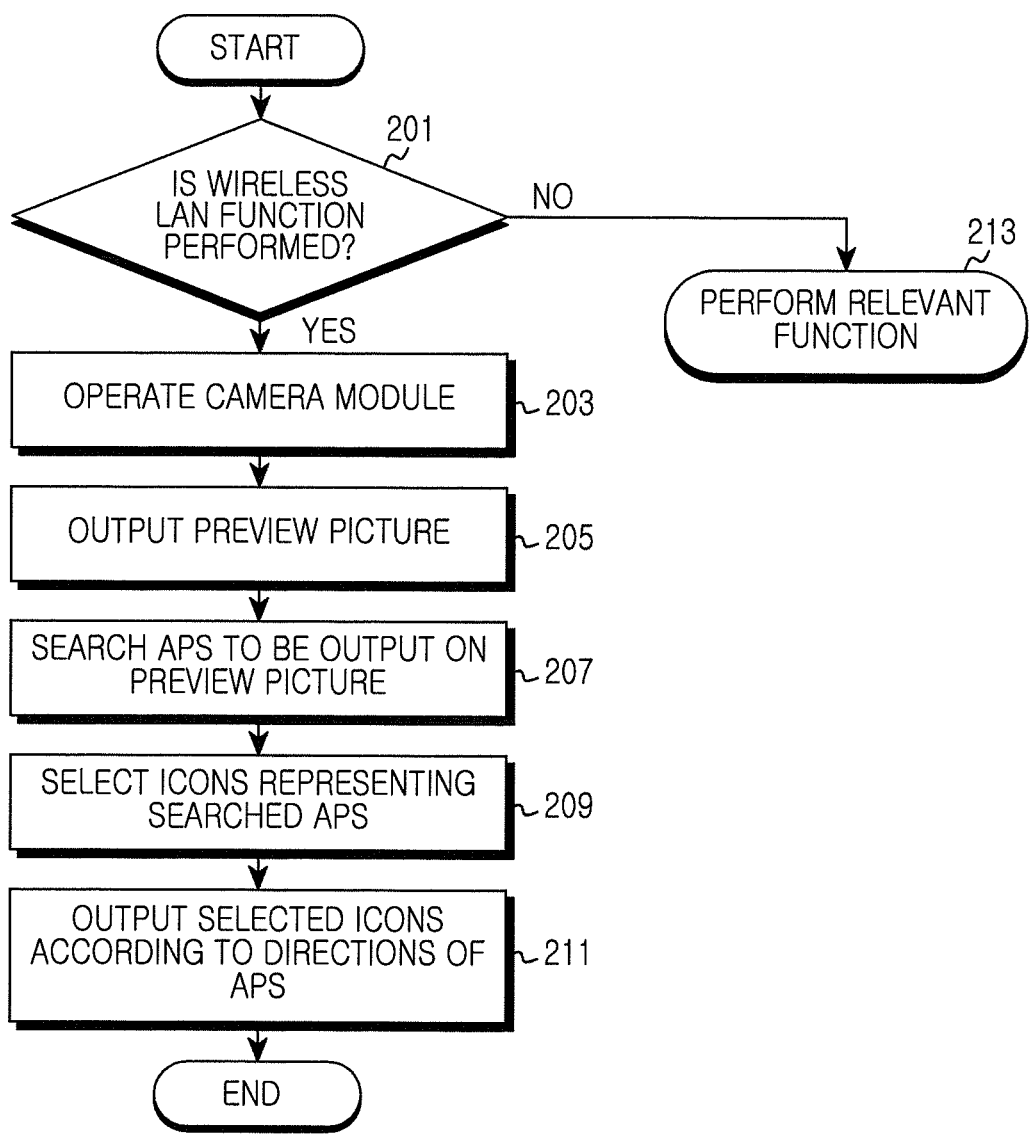
FIG. 2 illustrates an AP search process of a portable terminal according to the present disclosure.

FIG. 2 illustrates an AP search process of a portable terminal according to the present disclosure.

Referring to FIG. 2, the portable terminal verifies whether to perform a wireless LAN function in step 201.

If the portable terminal does not perform the wireless LAN function in step 201, it proceeds to step 213 and performs a corresponding function (e.g., a waiting mode).

On the other hand, if the portable terminal performs the wireless LAN function, it proceeds to step 203 and operates a camera module. The portable terminal proceeds to step 205 and outputs data input through the camera module on a preview picture. Herein, the portable terminal outputs the preview picture to perform an AP search process applying an augmented reality scheme.

The portable terminal proceeds to step 207 and searches APs to be output on the preview picture. The portable terminal proceeds to step 209 and selects icons representing the searched APs. That is, the portable terminal searches a plurality of the APs and selects the icons representing the APs to classify the searched APs.

The portable terminal proceeds to step 211 and outputs the icons selected in step 209 according to directions of the APs. That is, when searching, the APs in step 207, the portable terminal may verify names of the searched APs and strength of signals received from the APs, and may ascertain existence directions of the APs using the verified strength of the received signals. Therefore, the portable terminal may output positions where the APs exist based on the preview picture indicating a viewpoint of a user. In addition, although the viewpoint of the user is changed and the preview picture is moved, the portable terminal changes positions of the APs according to the changed viewpoint of the user.

Thereafter, the portable terminal ends the algorithm of FIG. 2.

Figure 3:
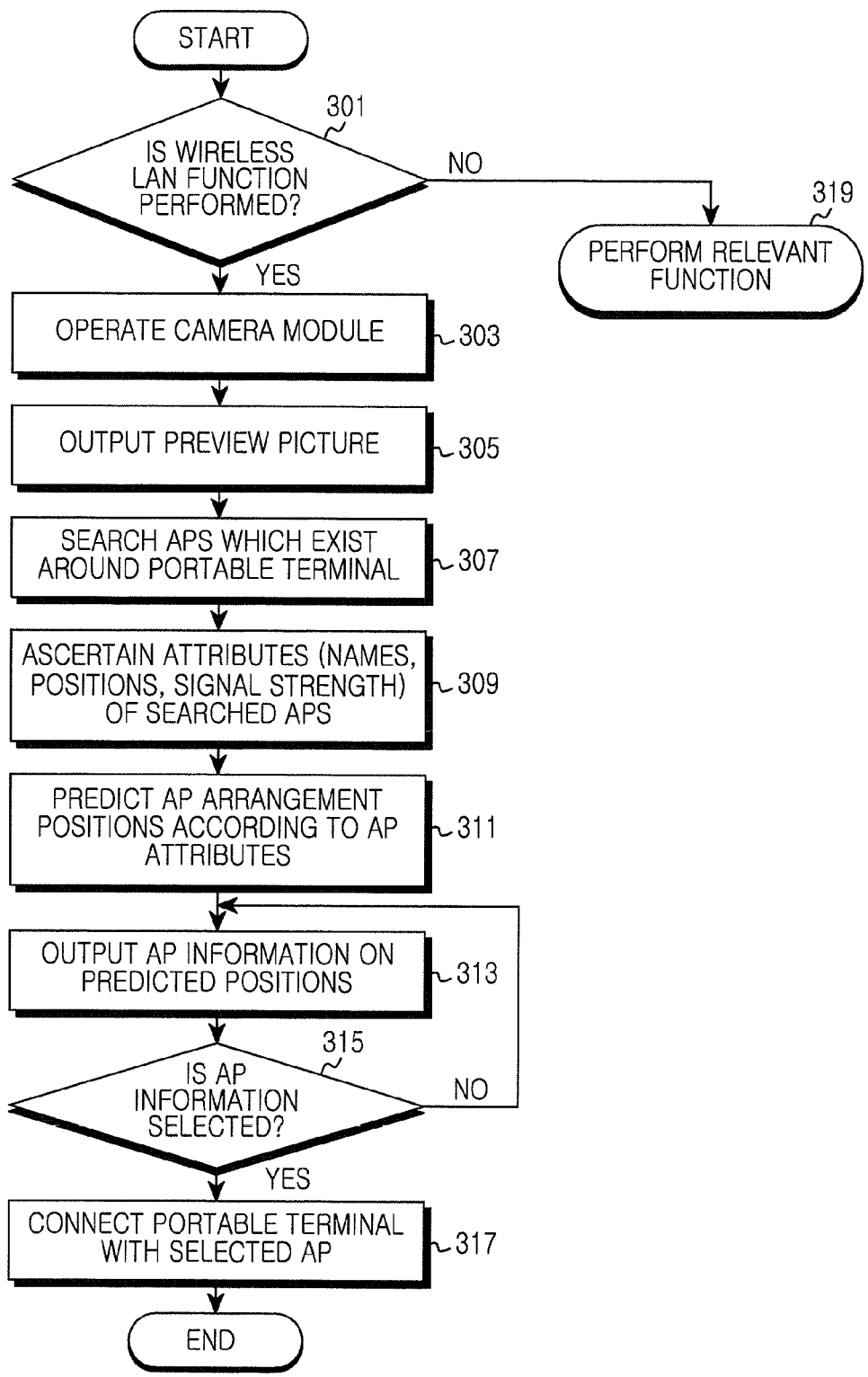
FIG. 3 illustrates an AP search process of a portable terminal according to one embodiment of the present disclosure.

FIG. 3 illustrates an AP search process of a portable terminal according to one embodiment of the present disclosure.

Referring to FIG. 3, the portable terminal verifies whether to perform a wireless LAN function in step 301.

If the portable terminal does not perform the wireless LAN function in step 301, it proceeds to step 319 and performs a corresponding function (e.g., a waiting mode).

On the other hand, if the portable terminal performs the wireless LAN function in step 301, it proceeds to step 303 and operates a camera module. The portable terminal proceeds to step 305 and outputs data input through the camera module on a preview picture. Herein, as described above, the portable terminal outputs the preview picture to perform an AP search process applying an augmented reality scheme.

The portable terminal proceeds to step 307 and searches APs which exist around it. The portable terminal proceeds to step 309 and ascertains attributes of the searched APs. Herein, each of the attributes of the APs may be a name, a position, and signal strength of each of the APs.

The portable terminal proceeds to step 311 and predicts AP arrangement positions according to the attributes of the APs. Herein, the portable terminal predicts directions where the searched APs exist actually and wants to output information of the corresponding AP on the predicted directions.

The portable terminal proceeds to step 313 and outputs the information of the APs on the predicted positions. That is, the portable terminal outputs icons symbolizing the searched APs in directions where the searched APs exist. The portable terminal may output the icons together with names of the APs and strength of signals received from the APs without simply informing existence directions of the icons.

At this time, the portable terminal separately outputs the icons symbolizing the searched APs by different colors and outputs contours indicating strength of signals received from the APs to classify the strength of the received signals as well as the positions of the APs and enhance an AP selection determination rate by a user.

The portable terminal proceeds to step 315 and verifies whether an AP is selected by the user in a state where information of the APs is output on the preview picture.

If the AP is not selected by the user in step 315, the portable terminal performs the processing of step 313 again.

On the other hand, if the AP is selected by the user in step 315, the portable terminal proceeds to step 317, verifies the AP selected by the user, and performs connection with the verified AP.

Thereafter, the portable terminal ends the algorithm of FIG. 3.

Figure 4A:
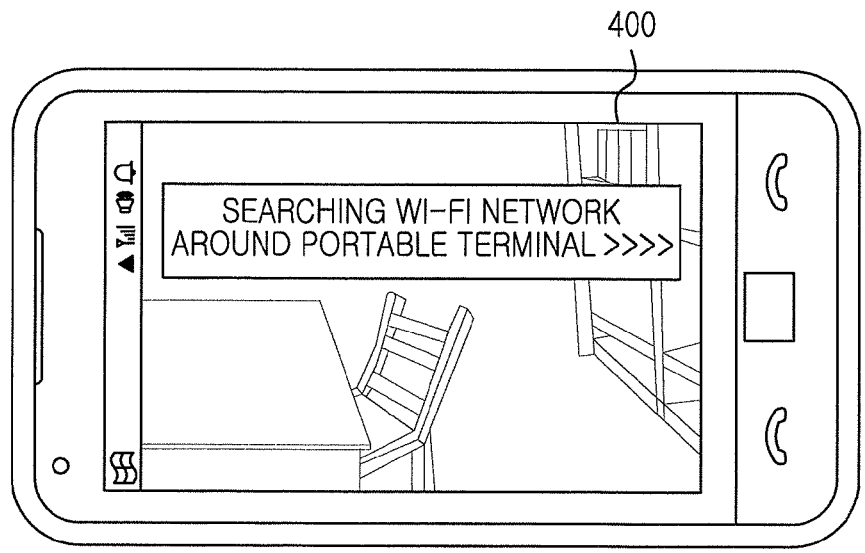
FIG. 4A illustrates a picture for searching APs according to execution of a wireless LAN function in a portable terminal according to the present disclosure.

FIG. 4A illustrates a picture for searching APs according to execution of a wireless LAN function in a portable terminal according to the present disclosure.

Referring to FIG. 4A, the portable terminal performs a wireless LAN function by selection of a user. As shown in of FIG. 4A, the portable terminal operates a camera module and outputs a preview picture 400. Herein, the preview picture 400 is a picture corresponding to a viewpoint of the user. The viewpoint output on the preview picture 400 may be changed by the user.

The portable terminal which outputs the preview picture 400 searches APs which exist around it and classifies APs capable of being output on the output picture. Herein, the portable terminal verifies signal strength, names, positions, etc. of the searched APs in a state where a message for informing that APs are being searched is output on the preview picture 400, and classifies APs which exist on positions which are identical to viewpoints of the user according to the output preview picture 400.

Figure 4B:
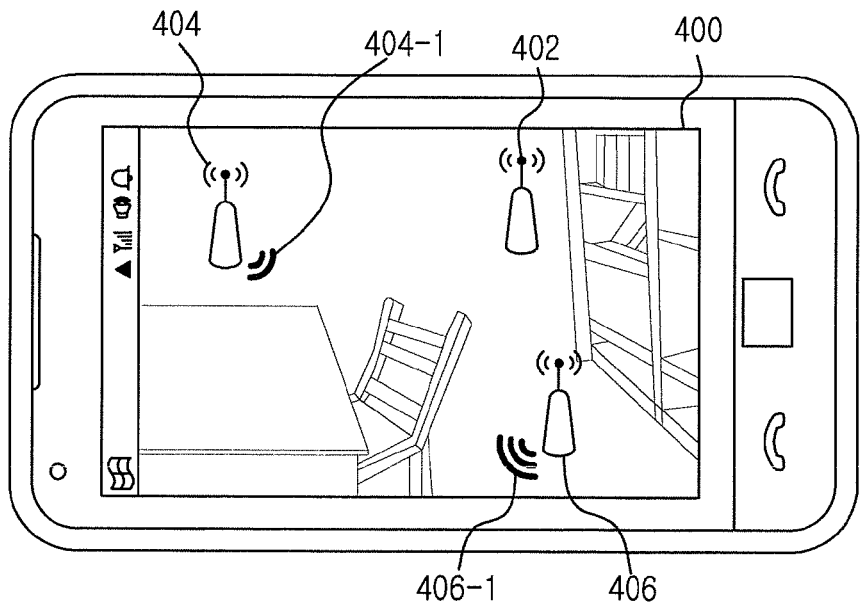
FIG. 4B illustrates a picture for outputting searched APs in a portable terminal according to the present disclosure.

FIG. 4B illustrates a picture for outputting searched APs in a portable terminal according to the present disclosure.

Referring to FIG. 4B, the portable terminal outputs icons symbolizing the APs classified in FIG. 4A on the preview picture 400. The output APs described above are APs output on a picture corresponding to a viewpoint of a user. As shown in FIG. 4B, three APs 402, 404, and 406 exist on the viewpoint of the user. The portable terminal may divides the classified APs into different icons and divides the different icons by different colors. The portable terminal may output strength information 404-1 and 406-1 of signals received from the APs together. In accordance with another embodiment of the present disclosure, the portable terminal may display strength of signals received from the APs by contours and classifies strength of the received signals and distance from the user according to intervals of the contours. In addition, if it is verified that different APs exist in addition to the APs output on the preview picture, the portable terminal displays directions of the APs based on a currently output picture and allows the user to moves the preview picture to search the different APs.

Therefore, the user verifies the output information of the APs, and may also ascertain information about directions where the APs are positioned correctly as well as names of the APs and strength of signals received from the APs which exist around the portable terminal.

Also, the user of the portable terminal may select an AP to be connected on AP information output on the preview picture. The portable terminal may perforin connection with the AP selected by the user.

As shown in FIGS. 4A and 4B, a method of providing position information of APs using an augmented reality scheme was described. However, the present disclosure ascertains positions of APs using signals of the APs. The present disclosure may generate a field for providing (simple) position information of APs when providing a Wi-Fi profile and may provide position information (e.g., an east direction, the direction of three o'clock, etc.) of the ascertained APs.

As described above, the present disclosure improves an AP search performance by providing positions of APs using an augmented reality scheme. The present disclosure outputs information including positions of APs on a preview picture and also ascertains information about directions where the APs are positioned correctly as well as names of the APs and strength of signals received from the APs which exist around the portable terminal. Also, the present disclosure allows a user to verify the preview picture and select an AP to be connected, and performs connection with the selected AP.

While the present invention has been particularly shown and described with reference to exemplary embodiments thereof, it will be understood by those skilled in the art that various changes in form and details may be made therein without departing from the spirit and scope of the present invention as defined by the appended claims.

What is claimed is:

1. A portable device comprising:
a communication unit configured to receive a signal from at least one Access Point (AP);
a camera configured to capture an image of a surrounding environment;
a display configured to output the captured surrounding environment image; and
a controller configured to:
identify the at least one AP with respective attributes comprising a name and a signal strength;
classify the at least one AP into a first AP located within the captured surrounding environment image and a second AP located outside the captured surrounding environment image;
augment the captured surrounding environment image with the first AP based on a respective position of the first AP on the display;
display, on the augmented image, a direction indicator pointing toward the second AP outside the augmented image;
receive an input selecting an AP from at least one AP on the augmented image; and
cause the communication unit to communicate with the selected AP.

2. The portable device of claim 1, wherein the controller is further configured to cause the display to indicate a plurality of APs as different icons with different colors.

3. The portable device of claim 1, wherein the controller is further configured to output the signal strength and a distance from each AP using intervals of contours on the augmented image.

4. The portable device of claim 1, wherein the controller is configured to insert position information of the at least one AP into a Wi-Fi profile and output the Wi-Fi profile on the display.

5. The portable device of claim 1, wherein, when a new AP is discovered, the controller is further configured to display a direction toward the new AP on the augmented image.

6. A method for a portable device, the method comprising:
capturing an image of surrounding environment around the portable device via a camera;
receiving a signal from at least one Access Point (AP) via a communication unit;
outputting the captured surrounding environment image on a screen;
identifying the at least one AP with respective attributes comprising a name and a signal strength;
classifying the at least one AP into a first AP located within the captured surrounding environment image and a second AP located outside the captured surrounding environment image;
augmenting the captured surrounding environment image with the first AP, based on respective position of the first AP on the screen;
displaying, on the augmented image, a direction indicator pointing toward an the second AP outside the augmented image;
receiving an input selecting an AP from at least one AP on the augmented image; and
communicating with the selected AP via the communication unit.

7. The method of claim 6, further comprising:
distinctively outputting a plurality of APs as different icons with different colors on the augmented image.

8. The method of claim 6, further comprising:
outputting the signal strength and a distance from each AP using intervals of contours on the augmented image.

9. The method of claim 6, further comprising:
outputting a Wi-Fi profile comprising location information of each AP.

10. The method of claim 6, further comprising:
when a new AP is found, displaying a direction toward the new AP on the augmented image.

11. A non-transitory computer readable medium for searching for Access Points (APs) for a portable terminal, the computer readable medium storing executable instructions configured to, when executed by a processor, cause the processor to perform actions comprising:
capturing an image of surrounding environment through a camera;
receiving a signal of at least one AP via a communication unit;
identifying the at least one AP by respective attributes comprising a name and a signal strength;
classifying the at least one AP into a first AP located within the captured surrounding environment image and a second AP located outside the captured surrounding environment image;
augmenting the captured surrounding environment image with the first AP, based on respective position of the first AP on a screen;
displaying, on the augmented image, a direction indicator pointing toward the second AP outside the augmented image;
receiving an input selecting an AP from at least one AP on the augmented image; and
communicating with the selected AP via the communication unit.

12. The non-transitory computer readable medium of claim 11, the actions further comprising outputting a plurality of APs as different icons with different colors.

13. The non-transitory computer readable medium of claim 11, the actions further comprising:
outputting a strength of the received signal and a distance from each AP using intervals of the contours on the screen.

14. The non-transitory computer readable medium of claim 11, further the actions further comprising:
inserting position information of each AP in a Wi-Fi profile; and
outputting the Wi-Fi profile on the screen.

15. A mobile terminal comprising:
a communication unit configured to receive a signal from at least one Access Point (AP);
a camera configured to capture an image of surrounding environment;
a screen configured to output the captured surrounding environment image as a preview image; and
a controller configured to:
determine a strength of the signal received from each AP;

classify the at least one AP into a first AP located within the captured surrounding environment image and a second AP located outside the captured surrounding environment image;

augment the captured surrounding environment image with the first AP based on respective position of the first AP;

display, on the augmented image, a direction indicator pointing toward the second AP outside the augmented image; and receive an input selecting an AP from at least one AP on the augmented image.

16. The mobile terminal of claim 15, wherein the controller is further configured to cause to the screen to display a plurality of APs as different icons with different colors.

17. The mobile terminal of claim 15, wherein the controller is further configured to display the signal strength of each AP on the screen.

18. The mobile terminal of claim 15, wherein the controller is further configured to perform a connection with the AP selected by a user.

19. The mobile terminal of claim 15, wherein when a new AP is founded, the controller is further configured to display a direction toward the new AP on the augmented image.

* * * * *